United States Patent
Zuerker et al.

(10) Patent No.: US 11,892,078 B2
(45) Date of Patent: *Feb. 6, 2024

(54) SEALING ELEMENT, ANNULAR FILTER ELEMENT, OIL SEPARATOR, AND METHOD FOR CONTROLLING PREVAILING PRESSURE IN CRANKCASE VENTILATION SYSTEM

(71) Applicant: MANN+HUMMEL GmbH, Ludwigsburg (DE)

(72) Inventors: Markus Zuerker, Dudenhofen (DE); Markus Melde, Speyer (DE); Philipp Ehrhardt, Karlsdorf-Neuthard (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 460 days.

This patent is subject to a terminal disclaimer.

(21) Appl. No.: 17/121,339

(22) Filed: Dec. 14, 2020

(65) Prior Publication Data

US 2021/0164569 A1    Jun. 3, 2021

Related U.S. Application Data

(60) Continuation of application No. 16/278,129, filed on Feb. 17, 2019, now Pat. No. 10,865,672, and a
(Continued)

(30) Foreign Application Priority Data

Jun. 1, 2015 (DE) .......................... 102015006767.2
Jun. 1, 2015 (DE) .......................... 102015006768.0

(51) Int. Cl.
*F16J 15/02* (2006.01)
*F01M 13/04* (2006.01)
(Continued)

(52) U.S. Cl.
CPC ........ *F16J 15/022* (2013.01); *B01D 46/0004* (2013.01); *B01D 46/2411* (2013.01);
(Continued)

(58) Field of Classification Search
None
See application file for complete search history.

(56) References Cited

U.S. PATENT DOCUMENTS 3,231,089 A * 1/1966 Thornton ............... B01D 27/10
  137/859
5,487,767 A * 1/1996 Brown ............... B01D 46/4227
  55/482

(Continued)

*Primary Examiner* — Brit E. Anbacht

(57) ABSTRACT

An annular filter element and sealing element for an oil separator of a crankcase ventilation system, the filter element has a covering surface extending parallel to a direction of flow, together with at least one cover element covering surface in at least some regions. An oil separator is taught having the filter element with at least one pressure control valve controlling crankcase pressure and has a valve closing body that operates in conjunction with a valve seat. The sealing element having at least one radially sealing region that is configured to act in the direction of the radius of the annular filter element, and at least one axially sealing region that is configured to act in the direction of the longitudinal axis of the annular filter element.

15 Claims, 9 Drawing Sheets

Related U.S. Application Data continuation of application No. 15/169,932, filed on Jun. 1, 2016, now Pat. No. 10,876,631, said application No. 16/278,129 is a division of application No. 15/169,848, filed on Jun. 1, 2016, now Pat. No. 10,221,736.

(51) Int. Cl.
*B01D 46/00* (2022.01)
*B01D 46/24* (2006.01)
*B01D 46/42* (2006.01)

(52) U.S. Cl.
CPC ......... B01D 46/4227 (2013.01); F01M 13/04 (2013.01); *B01D 2265/027* (2013.01); *B01D 2271/022* (2013.01); *B01D 2271/027* (2013.01); *F01M 2013/0438* (2013.01)

(56) References Cited

U.S. PATENT DOCUMENTS

| | | | | |
|---|---|---|---|---|
| 5,697,349 A * | 12/1997 | Blum | ............... | F01M 13/023 123/572 |
| 5,697,351 A * | 12/1997 | Schumacher | ........ | F01M 13/023 123/574 |
| 5,800,584 A * | 9/1998 | Hinderer | ................ | B01D 46/24 55/482 |
| 5,882,367 A * | 3/1999 | Morgan | ............. | B01D 46/0031 55/505 |
| 6,159,261 A * | 12/2000 | Binder | ............... | B01D 46/2411 55/498 |
| 6,309,436 B1 * | 10/2001 | Holch | ................ | B01D 46/003 55/482 |
| 6,447,567 B1 * | 9/2002 | Ehrenberg | ......... | B01D 46/2414 55/498 |
| 6,554,140 B2 * | 4/2003 | Steger, Jr. | .......... | B01D 46/0012 210/DIG. 17 |
| 6,579,448 B2 * | 6/2003 | Dworatzek | ............ | B01D 35/30 210/DIG. 17 |
| 6,579,488 B1 * | 6/2003 | Kobayashi | ............ | B29C 45/561 264/161 |
| 6,638,332 B1 * | 10/2003 | Schmitz | ............. | B01D 46/0041 210/450 |
| 6,640,792 B2 * | 11/2003 | Harvey | ................ | F01M 13/04 123/572 |
| 6,802,303 B2 * | 10/2004 | Håkansson | ........ | F01M 13/0011 123/574 |
| 6,955,701 B2 * | 10/2005 | Schrage | ............. | B01D 46/0001 55/521 |
| 7,011,011 B2 * | 3/2006 | Jessberger | ............. | F15B 15/10 92/99 |
| 7,159,731 B2 * | 1/2007 | Kai | ..................... | B01D 36/001 210/120 |
| 7,531,090 B1 * | 5/2009 | Stamey, Jr. | .......... | B01D 35/153 210/443 |
| 7,628,837 B2 * | 12/2009 | Ehrenberg | ......... | B01D 46/2414 55/423 |
| 7,740,679 B2 * | 6/2010 | Ehrenberg | ......... | B01D 46/0001 264/254 |
| 7,828,881 B2 * | 11/2010 | Barnwell | ............ | B01D 46/003 55/504 |
| 7,837,754 B2 * | 11/2010 | Johnson | ............... | B01D 29/232 55/482 |
| 8,404,029 B2 * | 3/2013 | Lundgren | ............. | F01M 13/04 55/498 |
| 2004/0083692 A1 * | 5/2004 | Dworatzek | ........ | B01D 46/0087 55/498 |
| 2004/0112348 A1 * | 6/2004 | Dworatzek | ............ | F01M 13/04 123/572 |
| 2004/0217042 A1 * | 11/2004 | Dworatzek | ........ | B01D 35/1573 210/130 |
| 2008/0035103 A1 * | 2/2008 | Barris | ................ | B01D 46/4272 123/198 E |
| 2008/0092498 A1 * | 4/2008 | Stewen | ............. | B01D 46/4272 15/352 |
| 2008/0245037 A1 * | 10/2008 | Rogers | ................ | B01D 39/163 55/385.3 |
| 2009/0050121 A1 * | 2/2009 | Holzmann | ............. | B01D 50/20 123/573 |
| 2009/0183717 A1 * | 7/2009 | Gillenberg | ............. | F01M 13/04 123/573 |
| 2010/0031940 A1 * | 2/2010 | Mosset | ............ | B01D 46/2414 123/573 |
| 2010/0101425 A1 * | 4/2010 | Herman | ............ | F01M 13/0011 55/447 |
| 2011/0017155 A1 * | 1/2011 | Jacob | ................ | B01D 46/2414 123/41.86 |
| 2011/0023425 A1 * | 2/2011 | De Paepe | .......... | B01D 46/0087 55/312 |
| 2011/0154790 A1 * | 6/2011 | Israel | ................ | B01D 46/0031 55/495 |
| 2011/0258975 A1 * | 10/2011 | Lundgren | ............ | B01D 46/0087 55/357 |
| 2012/0159915 A1 * | 6/2012 | Heckel | ................ | B01D 29/908 55/510 |
| 2012/0272930 A1 * | 11/2012 | Bittner | ............... | F01M 13/0011 123/41.86 |
| 2013/0305672 A1 * | 11/2013 | Adkins | ............... | B01D 46/2411 55/498 |
| 2014/0208702 A1 * | 7/2014 | Lundgren | .......... | B01D 46/4227 55/357 |
| 2014/0215982 A1 * | 8/2014 | Wood | ..................... | F01M 13/04 55/502 |
| 2017/0014745 A1 * | 1/2017 | Zuerker | ................ | B01D 46/2411 |
| 2017/0050138 A1 * | 2/2017 | Billiet | ................ | B01D 46/2411 |

\* cited by examiner

SEALING ELEMENT, ANNULAR FILTER ELEMENT, OIL SEPARATOR, AND METHOD FOR CONTROLLING PREVAILING PRESSURE IN CRANKCASE VENTILATION SYSTEM

CROSS-REFERENCE TO RELATED APPLICATIONS

This application is a Continuation of U.S. application Ser. No. 15/169,932, filed 1 Jun. 2016, which claims a priority date of 1 Jun. 2015 based upon prior filed German patent application No. DE 102015006767.2, filed 1 Jun. 2015. The entire contents of the aforesaid U.S. application Ser. No. 15/169,932 and the German patent application No. DE 102015006767.2 being incorporated herein by reference to the fullest extent permitted by the law.

This application is a Continuation of U.S. application Ser. No. 16/278,129, filed 17 Feb. 2019, which is a Divisional of U.S. application Ser. No. 15/169,848, filed 1 Jun. 2016, Now U.S. Pat. No. 10,221,736 B2, which claims a priority date of 1 Jun. 2015 based upon prior filed German patent application No. DE 102015006768.0, filed 1 Jun. 2015. The entire contents of the aforesaid U.S. application Ser. No. 16/278,129, the aforesaid U.S. application Ser. No. 15/169,848 and the German patent application No. DE 102015006768.0 being incorporated herein by reference to the fullest extent permitted by the law.

TECHNICAL FIELD

The invention relates to a sealing element for a replaceable filter element of an oil separator of a crankcase ventilation system and to an oil separator, as well as a method. The invention further relates to a filter element for an oil separator, an oil separator of a crankcase ventilation system, and a method for controlling the prevailing pressure in a crankcase ventilation system.

BACKGROUND

With reciprocating piston internal combustion engines, an oil-containing leakage gas, so-called blow-by, is produced in the crankcase. The return thereof into the combustion process is legally mandated worldwide, and takes place in so-called closed crankcase ventilation systems. The most important tasks of a crankcase ventilation system are oil separation and oil return into the crankcase, as well as the regulation of the crankcase pressure. The requirements for oil separation have been steadily increasing in recent years, as legislation on emissions has grown increasingly stringent, in order to protect emissions-related engine components such as exhaust gas turbochargers, intercoolers, or sensors from performance loss due to oil contamination. Thus, oil separation is important not only in minimizing oil consumption, but also in making what is now an essential contribution to compliance with emissions legislation throughout the lifetime of the vehicle. In addition to oil separation, a crankcase ventilation system contains other important components, such as, for example, a pressure control valve, depending on the ventilation design.

In order to extend the life of the return spring in a pressure control valve for an internal combustion engine, DE 10 2004 02 22 75 A1 proposes arranging the return spring on the side of the valve closing body facing away from the valve seat, and thus preventing the return spring from contacting aggressive blow-by gases emerging from the crankcase. Documents WO 2007 13 50 82 A2 and JP 2003 33 65 16 A disclose arranging the return spring on the atmosphere side of a pressure control valve.

The crankcase ventilation has two spaces that must be separated from one another—namely, a pre-filtration side, on which the not-yet-cleaned blow-by gas is located, and a post-filtration side, on which the cleaned gas is located.

In addition to separating and sealing off the pre-filtration side from the post-filtration side, the pre-filtration side and post-filtration side must additional be separated and sealed off from the atmosphere. These three sealing functions are performed, in the prior art, predominantly by three individual seals, for example, three individual O-rings or three individual molded seals.

In addition to individual seals, each of which fulfills only one sealing function, so-called combined seals that fulfill more than one sealing function are also known in the prior art. Thus, EP 2 272 580 A1 discloses a combined seal (cf. reference sign 25 of the FIG. 1 in EP 2 272 580 A1) for a filter insert of a crankcase ventilation system, wherein this combined seal comprises two continuous sealing elements that each act in the radial direction of the filter insert and are spaced apart axially from one another.

In addition, DE 10 2010 063 161 A1 discloses a fluid filter device having a radially-acting combined seal. This combined seal acts between an annular filter element and a dome mounted coaxially onto the annular filter element, and fulfills two sealing functions. On the one hand, this combined seal seals the pre-filtration side of the fluid filter device against backflow, while on the other hand, the combined seal seals the pre-filtration side of the fluid filter device from the post-filtration side of the fluid filter device.

DE 20 2006 017 61 U1 discloses a liquid filter having a radially-acting seal that seals an upper end plate of an annular filter element off from the tube body of a support dome configured in order to support the annular filter element.

SUMMARY

The invention addresses the problem of developing a filter element of the aforementioned type, an oil separator of the aforementioned type, and a method of the aforementioned type, in such a manner that the functions thereof are optimized, in particular, that the crankcase ventilation system takes up the least installation space possible.

The invention is based on realizing the functions of the crankcase ventilation system with the fewest possible components.

According to the invention, the cover element of the filter element comprises at least one clean fluid discharge element that: leads out from the interior of the filter element; in particular, extends away from the filter element; in particular, is tube-shaped; and is configured in order to remove the purified fluid, in particular, clean air. The end surface of this clean fluid discharge element that faces away from the filter element is configured as a sealing surface for a valve of the crankcase ventilation system, or comprises a sealing surface for a valve of the crankcase ventilation system. Preferably, the sealing surface is a valve seat for a valve closing body, in particular, for a valve closing body sealing element of a pressure control valve that surrounds the valve closing body. In addition to the function of discharging or removing the purified fluid, the clean fluid discharge element thus assumes another function, namely, a sealing function.

The sealing surface is substantially flat and free of burrs, wherein the ends, margins, or edges of the sealing surface may be rounded. In addition, the sealing surface is preferably round, in particular, circular.

The arrangement of the sealing surface on the clean fluid discharge element, as described, causes the sealing surface and the plane defined thereby to be preferably spaced apart from the axial, outer surface of the cover element. This arrangement likewise defines the distance of the valve from the cover element. Within this distance, the clean fluid outlet of the oil separator housing, in which the filter element is to be incorporated, can be advantageously arranged so as to conserve installation space. For a streamlined overall design, it is therefore preferred that the length of the clean fluid discharge element, as measured from the axial, outer surface of the cover element, corresponds approximately to the diameter of the clean fluid outlet of the oil separator housing.

The present invention is based on providing an all-in-one sealing element that fulfills both a radial sealing function and an axial sealing function, wherein the radially sealing region and the axially sealing region are configured so as to be continuous.

"Radial" means here in the direction of the radius of the annular filter element. "Axial" means here in the direction of the longitudinal axis of the annular filter element.

Advantageously, the oil separator has a filter housing configured in order to accommodate the annular filter element. This filter housing advantageously has a round—for example, circular or oval—cross-section.

In a particularly advantageous embodiment of the present invention, the axially sealing region is arranged between two parts of the filter housing, and the radially sealing region is arranged within the filter housing.

The interior of the filter housing is divided by the annular filter element into a pre-filtration space or pre-filtration side containing unfiltered fluid, and a post-filtration space or post-filtration side containing filtered fluid.

In a particularly advantageous embodiment of the present invention, the sealing element comprises the two sealing regions—namely, the radially sealing region and the axially sealing region—in order to seal the pre-filtration side of the oil separator off from the post-filtration side of the oil separator, and in order to seal the interior of the oil separator off from the environment.

For example, the radially sealing region may be configured so as to seal off the pre-filtration side from the post-filtration side, and the axially sealing region is configured so as to seal the interior of the filter housing off from the environment or from the atmosphere.

In this particularly advantageous embodiment of the present invention, the sealing element is configured so as to fulfill three sealing functions or sealing tasks in the operating position thereof, namely:
a) sealing the pre-filtration side off from the atmosphere,
b) sealing the post-filtration side off from the atmosphere, and
c) sealing the post-filtration side off from the pre-filtration side.

In order to functionally decouple the radially sealing region and the axially sealing region, the radially sealing region advantageously is arranged at an, in particular, axial and/or radial distance from the axially sealing region. In this manner, the two sealing regions are functionally independent, but integrated into one part. For example, in this manner, the sealing function of the sealing of the pre-filtration side or the post-filtration side from the atmosphere can be decoupled from the sealing function of the sealing of the post-filtration side from the pre-filtration side. The spacing apart of the sealing regions is advantageously achieved by means of a connecting strut that connects the two sealing regions. The connecting strut preferably has the shape of a short, tube-shaped hollow cylinder section. This may preferably be relatively thin, e.g., thinner than the cross-sections of the sealing regions. The connecting strut may also have an L-shaped cross-section. This signifies that from the aforementioned hollow cylindrical shape, which forms one leg of the L, another leg protrudes radially inward or outward, thus forming a circular annular disc-shaped second connecting strut section. This makes it possible to have another radial distance, preferably in addition to the axial distance, between the sealing regions. This makes it possible for a housing upper part or cover in a narrow installation region to provide independent sealing surfaces corresponding to the sealing regions, e.g., by the housing upper part or housing cover also having a cross-section that is also L-shaped in sections in the region of the sealing element, wherein the axial leg provides a contact surface for the radially sealing region and the radial leg provides a contact surface for the axially sealing region of the sealing element.

A distance between the radically sealing region and the axially sealing region also makes it possible to arrange the radially sealing region within the filter housing of the oil separator and arrange the axially sealing region between two housing parts or housing halves of the filter housing of the oil separator.

Advantageously, the radially sealing region and the axially sealing region are arranged at an offset to one another in the direction of the longitudinal axis of the annular filter element; in particular, the radially sealing region may be arranged above the axially sealing region so as to follow the direction of flow of the fluid to be filtered.

Advantageously, the axially sealing region has, on the side thereof facing away from the radially sealing region, a cylinder tube-shaped continuation that has an insertion slope at the end on the outside. This simplifies installation of the sealing element or a filter element with such a sealing element in a corresponding housing.

In order to remove the filtered clean fluid, a first or upper housing part of the filter housing advantageously has a clean fluid outlet. Advantageously, the radially sealing region of the sealing element is arranged at the same height as the first or upper housing part, in particular, as the clean fluid outlet. This makes it possible to dismount the upper housing part from another housing part, in particular, from a housing body configured in order to accommodate the annular filter element, by movement of the upper housing part by means of a tilting movement or by means of a rotational movement about an axis of rotation running perpendicular to the longitudinal axis of the annular filter element. In the prior art, however, the first or upper housing part can only be dismounted by means of an axial movement, i.e., a movement along the longitudinal axis of the annular filter element. The opening of the filter housing by means of a tilting movement makes it easier to replace the annular filter element, because the first or upper housing part can be supported on the housing edge of the additional housing part, in particular, the housing body.

In order to seal the interior of the filter housing off from the environment or from the atmosphere, the axially sealing region advantageously can be arranged between the first or upper housing part and the additional housing part—in particular, the housing body configured in order to accommodate the annular filter element—in such a manner that the axially sealing region is compressed between the first or upper housing part and the housing body by means of a defined force.

In order to separate oil from fluid, in particular, from an aerosol, the annular filter element advantageously has at least one filter medium that is arranged in the shape of a ring, in particular, a circular ring or oval ring, for example, by being wrapped.

As a filter medium, it is possible to use, for example, papers or non-woven fabrics made of metal fibers, glass fibers, or plastic fibers, in particular, polyester fibers. It would also be possible to combine these materials. In addition, as described in DE 10 2011 016 893 A1, the filter medium may be a coalescence medium.

In order to form the filter medium so as to be as stable as possible against forces acting on the filter medium from the outside, the filter medium advantageously has an oval, in particular, circular cross-section. In an advantageous embodiment of the crankcase ventilation system, the housing of the crankcase ventilation system that is formed of at least one housing part and configured in order to accommodate the filter medium also has an oval, in particular, circular cross-section.

The filter medium has a covering surface extending parallel to the direction of flow of the fluid flowing through the filter medium, and at least one end plate arranged on the covering surface.

This end plate is advantageously configured to separate the pre-filtration side of the filter housing, in particular, of the housing body from the post-filtration side of the filter housing, in particular, of the first or upper housing part.

The sealing element advantageously can be releasably or non-releasably fastened to the end plate. If the sealing element is fasted to the end plate, the sealing element can be replaced together with the annular filter element when the annular filter element is replaced, in one step. Another advantage of the fastening of the sealing element on the annular filter element is that the sealing element can be pre-assembled at the factory, thus avoiding operation errors when the sealing element is being replaced.

In order to fasten the sealing element to the filter element, the end plate may have a fastening contour, in particular, a groove, in which the radially sealing region of the sealing element can be arranged, in particular, clamped. Alternatively, the sealing element may be attached to the end plate in a two-component injection molding process.

Alternatively to the fastening at the end plate, the sealing element may also be fastened to the first or upper housing part of the filter housing. Thus, the sealing element may be tied up into the upper housing part, or the upper housing part may be encapsulated by the sealing element.

In order to stabilize the sealing element, the end plate may have a support contour extending in the direction of the longitudinal axis of the annular filter element. This support contour is configured so as to guide and/or keep a side—for example, a tab—of the axially sealing region of the sealing element that faces the annular filter element. This makes it possible to prevent the sealing element—in particular, a region or tab of the axially sealing region—from moving toward the filter medium so as to follow the direction of flow of the fluid, and folding inwards.

The radially sealing region advantageously can be arranged between the filter housing—in particular, the first or upper housing part—and the annular filter element-in particular, the end plate of the annular filter element—in such a manner that the radially sealing region is compressed radially between the filter housing and the annular filter element—in particular, between the upper housing part and the end plate—by means of a defined force.

In order to compress the radially sealing region between the filter housing and the annular filter element—in particular, between the upper housing part and the end plate—by means of a defined force, the upper housing part is preferably configured so that the upper housing part surrounds at least one region of the annular filter element—in particular, the end plate of the annular filter element, in particular, the annular groove—in the operation position thereof in such a manner that the upper housing part forms the counterpart to the seal (see FIGS. 2 and 3).

In one embodiment in which the radial sealing region and the axial sealing region are compressed by means of a defined force, as described above, the sealing element may, in the operation position thereof:
  seal the interior of the first or upper housing part, in particular, the post-filtration side, off from the environment;
  seal the interior of the housing body, in particular, the pre-filtration side arranged between the annular filter element and the housing body, from the environment; and
  seal the pre-filtration side off from the post-filtration side.

In a preferred embodiment, the cover element of the (annular) filter element comprises at least one clean fluid discharge element that: leads out from the interior of the filter element; in particular, extends away from the filter element; in particular, is tube-shaped; and is configured in order to remove the purified fluid, in particular, clean air. The end surface of this clean fluid discharge element that faces away from the filter element is configured as a sealing surface for a valve of the crankcase ventilation system, or comprises a sealing surface for a valve of the crankcase ventilation system. Preferably, the sealing surface is a valve seat for a valve closing body, in particular, for a valve closing body sealing element of a pressure control valve that surrounds the valve closing body. In addition to the function of discharging or removing the purified fluid, the clean fluid discharge element thus assumes another function, namely, a sealing function.

The sealing surface is substantially flat and free of burrs, wherein the ends, margins, or edges of the sealing surface may be rounded. In addition, the sealing surface is preferably round, in particular, circular.

The arrangement of the sealing surface on the clean fluid discharge element, as described, causes the sealing surface and the plane defined thereby to be preferably spaced apart from the axial, outer surface of the cover element. This arrangement likewise defines the distance of the valve from the cover element. Within this distance, the clean fluid outlet of the oil separator housing, in which the filter element is to be incorporated, can be advantageously arranged so as to conserve installation space. For a streamlined overall design, it is therefore preferred that the length of the clean fluid discharge element, as measured from the axial, outer surface of the cover element, corresponds approximately to the diameter of the clean fluid outlet of the oil separator housing.

The cover element is preferably an end plate of the filter element. The cover element is sealingly and non-releasably connected to the filter medium at an end face of the filter element, for example, by gluing or welding. The cover element is preferably produced from thermoplastic polymer, preferably by injection molding.

The clean fluid discharge element is preferably non-releasably (i.e., so as not to be non-destructively removable) and sealingly connected to the cover element, so that the pre-filtration side is separated from the post-filtration side. The clean fluid discharge element is particularly preferably integral with the cover element.

The clean fluid discharge element and the cover element are preferably continuously closed. This means that the clean fluid discharge element and the cover element are connected and designed such that other than the clean fluid exit opening surrounded by the sealing surface, no other openings are present in the cover element or clean fluid discharge element.

The clean fluid discharge element is preferably an oval cylindrical, in particular, circular cylindrical, in particular, straight tube. This tube comprises a closed cylindrical wall and two open ends, wherein the sealing surface is configured on one end that faces away from the cover element, and the other end is connected to the cover element, so that a fluid connection to the interior of the filter medium or filter body is formed. The ends are preferably oriented so as to be perpendicular to the central axis.

In a particularly preferred embodiment, the cover element is an annular end plate away from which the clean fluid discharge element, configured as a tube, extends on the side facing away from the filter medium.

The clean fluid element and the cover element preferably form an L-shaped or T-shaped cross-section.

A preferred embodiment of the filter element of the present invention comprises a clean fluid discharge element having an end surface configured so as to be flat and/or free of burrs in so as to be usable as a sealing surface, in particular, as a valve seat for a valve closing body of a pressure control valve of the crankcase ventilation system.

A person skilled in the art will appreciate the filter element of the present invention, in particular, in use in a crankcase ventilation system having an integrated pressure control or integrated pressure control valve. Namely, by means of the sealing surface according to the invention, the filter element may assume another function beyond separating oil from aerosol—namely, a partial function of the pressure control. The sealing surface of the filter element may then serve as a valve seat for the valve closing body of the pressure control valve. The sealing surface may also be configured in order to operate in conjunction with the control of the crankcase pressure, in particular, the limitation of the vacuum of the crankcase ventilation system.

The sealing surface of the filter element of the present invention makes it possible to significantly reduce the installation space for the crankcase ventilation system in comparison to, for example, prior art disclosed in documents DE 10 2013 005 624 A1 and WO 2005 088 417 A1, in which the valve seat of the pressure control valve is arranged on a housing side wall of the crankcase ventilation system. Thus, due to the sealing surface of the filter element according to the invention, the components of the pressure control valve, which is configured in order to control the crankcase pressure, can be accommodated in the upper housing part of the crankcase ventilation system.

A further reduction of the installation space can be achieved by designing the filter element so that the flow therethrough goes from the outside to the inside and so as to have a cavity configured in order to remove the purified fluid, in the interior of the filter medium. Thus, as opposed the prior art, in which the flow through is from the inside to the outside, it is not necessary to provide a channel by means of which the fluid can be delivered to the interior of the filter medium.

The cavity arranged in the interior of the filter medium and configured in order to remove the fluid is advantageously connected directly to the clean fluid discharge element or transitions directly into a cavity of the clean fluid discharge element that is configured in order to remove the fluid.

In order to form the filter medium so as to be as stable as possible against forces acting on the filter medium from the outside, the filter medium advantageously has an oval, in particular, circular cross-section. In an advantageous embodiment of the crankcase ventilation system, the housing of the crankcase ventilation system that is formed of at least one housing part and configured in order to accommodate the filter medium also has an oval, in particular, circular cross-section.

As the filter medium, it is possible to use basically any material, in particular, a nonwoven fabric, for example, made of metal fiber, glass fiber, and/or plastic fiber, for example, made of polyester. It would also be possible to combine these materials. In addition, as described in DE 10 2011 016 893 A1, the filter medium may be a coalescence medium. Preferably, the filter element is an annular coalescence element. For this purpose, the filter element preferably has a filter medium configured as a nonwoven fabric that preferably is wrapped repeatedly and thus in a plurality of layers annularly around a support tube. This means that the filter medium is preferably configured as at least one nonwoven wrap. To stabilize and seal off, a cover element that is preferably configured as an end plate is also provided on respective end faces.

The oil separator is preferably configured, as described, as a coalescing filter. The crankcase ventilation system may be configured as a closed crankcase ventilation system in which the post-filtration leakage gas is returned to the combustion process, or as an open crankcase ventilation system.

The sealing surface of the filter element is particularly stable and is particularly easy to produce if the sealing surface, the clean fluid discharge element, and the cover element are integral with one another, as is preferred.

Independently thereof or in connection thereto, in a preferred embodiment of the filter element of the present invention, the sealing surface and/or the end plate is made of a mechanically fixed and/or rigid material, for example, polyamide 66 having 35% glass fibers (PA 66 GF35).

In order to improve the tightness of the sealing of the pressure control valve, the valve closing body has at least one elastic valve closing body sealing element, at least on the region thereof that can be arranged in contact with the valve seat of the filter element.

The sealing element of the valve closing body advantageously has substantially at least one elastomer. In particular, the valve closing body sealing element may be formed of at least one elastomer, for example, ethylene acrylate rubber (EAR) and/or from, in particular, hydrogenated nitrile rubber ([H]NBR) and/or acrylate rubber. In comparison to the prior art, in which the sealing off of the valve seat and the valve closing body is performed solely by hard components, the tightness of the seal of the pressure control valve may be considerably improved by the elastic configuration of the valve closing body sealing element.

In an advantageous embodiment of an oil separator of the present invention, the sealing happens from soft to hard. Thus, for example, the valve closing body and the clean fluid discharge element, in particular, the valve seat are formed essentially out of polyamide 66 with 35% glass fiber (PA 66 GF35) and the valve closing body sealing element is formed essentially out of ethylene acrylate rubber (EAR) and/or acrylate rubber.

The tightness of the seal of the pressure control valve can also be improved by connecting the sealing element of the valve closing body fixedly or non-releasably to the valve closing body, in particular, application to the valve closing body by means of at least one spray process. The valve closing body sealing element and the valve closing body thus advantageously form a unit. In one advantageous embodiment of the present invention, the valve closing body sealing element is not tied up into the valve body, as is known in the prior art, but rather the valve body is encapsulated by the valve closing body sealing element, and forms a solid unit with the valve closing body sealing element.

Another limiting criterion of an advantageous embodiment of an oil separator of the present invention relative to the prior art is thus that the valve closing body and the valve closing body sealing element are fixedly connected to one another. The valve closing body sealing element thus forms a solid unit with the valve closing body, which improves the tightness of the seal.

A particularly high tightness of the seal of the pressure control valve may also be achieved by configuring the valve closing body so as to be flat or level at a region thereof that faces the valve seat, in particular, a region thereof that can be arranged in contact with the valve seat of the filter element. In contrast, in the prior art, the valve closing body is usually curved in the shape of a dish on the region thereof that faces the valve seat. In contrast to the dish shape in the prior art, the valve closing body—in particular, the valve closing body sealing element—of an optimized embodiment of an oil separator of the present invention thus has a flat or level shape, whereby the sealing properties are greatly improved.

Independently thereof or in connection therewith, a particularly advantageous embodiment of an oil separator of the present invention has an advantage over the prior art, for example, that is illustrated in FIG. 12, in that the components of the pressure control valve or the pressure control are located in the upper part of the housing.

An advantageous special feature of the present invention is that the unit filter element can constitute, in particular, the end position for the valve closing body.

Another special feature of the present invention is that the filter element can preferably assume two functions:
1. Separating oil from the gas
2. Partial function of the pressure control

BRIEF DESCRIPTION OF THE DRAWINGS

As already discussed above, there are several approaches to advantageously embodying and developing the teaching of the present invention.

Identical or similar designs, elements, or features are provided with identical reference signs in FIGS. 1 to 12.

DETAILED DESCRIPTION

Figure 1:
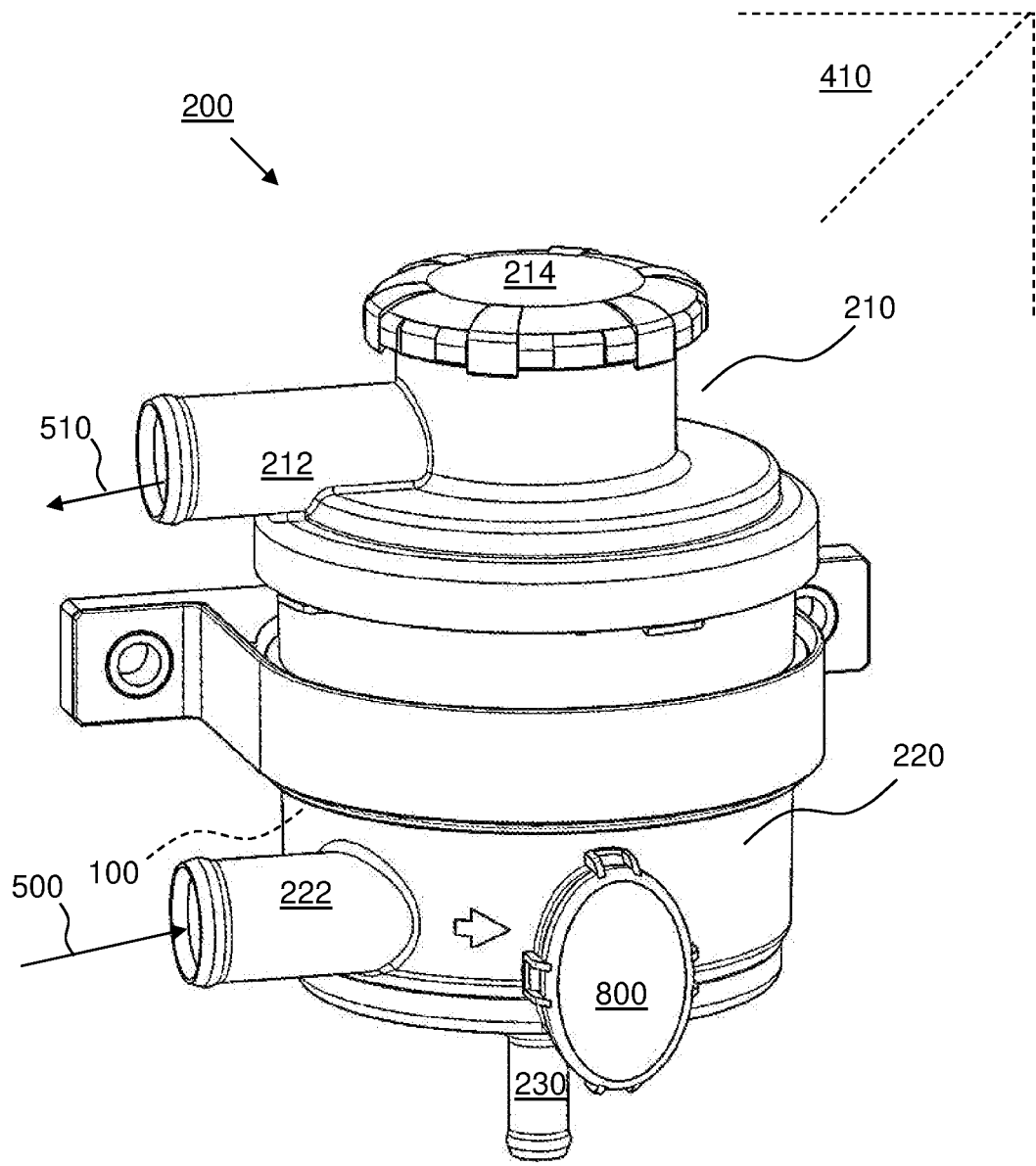
FIG. 1 illustrates a perspective view of an embodiment of a crankcase ventilation system according to the present invention, having a pressure control valve.

FIG. 1 illustrates a perspective view of a crankcase 410 (shown only schematically), which comprises an oil separator 200 of a crankcase ventilation system. The crankcase 410 is part of an internal combustion engine. The internal combustion engine may be installed in a motor vehicle. The oil separator 200 is configured as an oil separator for oil-containing air from an interior of the crankcase 410. In such applications, the oil-containing air is usually mixed with combustion gases exiting from the cylinders as leakage gas into the crankcase. This mixture is frequently also called crankcase gas, the term "air" still also being used for the sake of simplicity.

Figure 2:
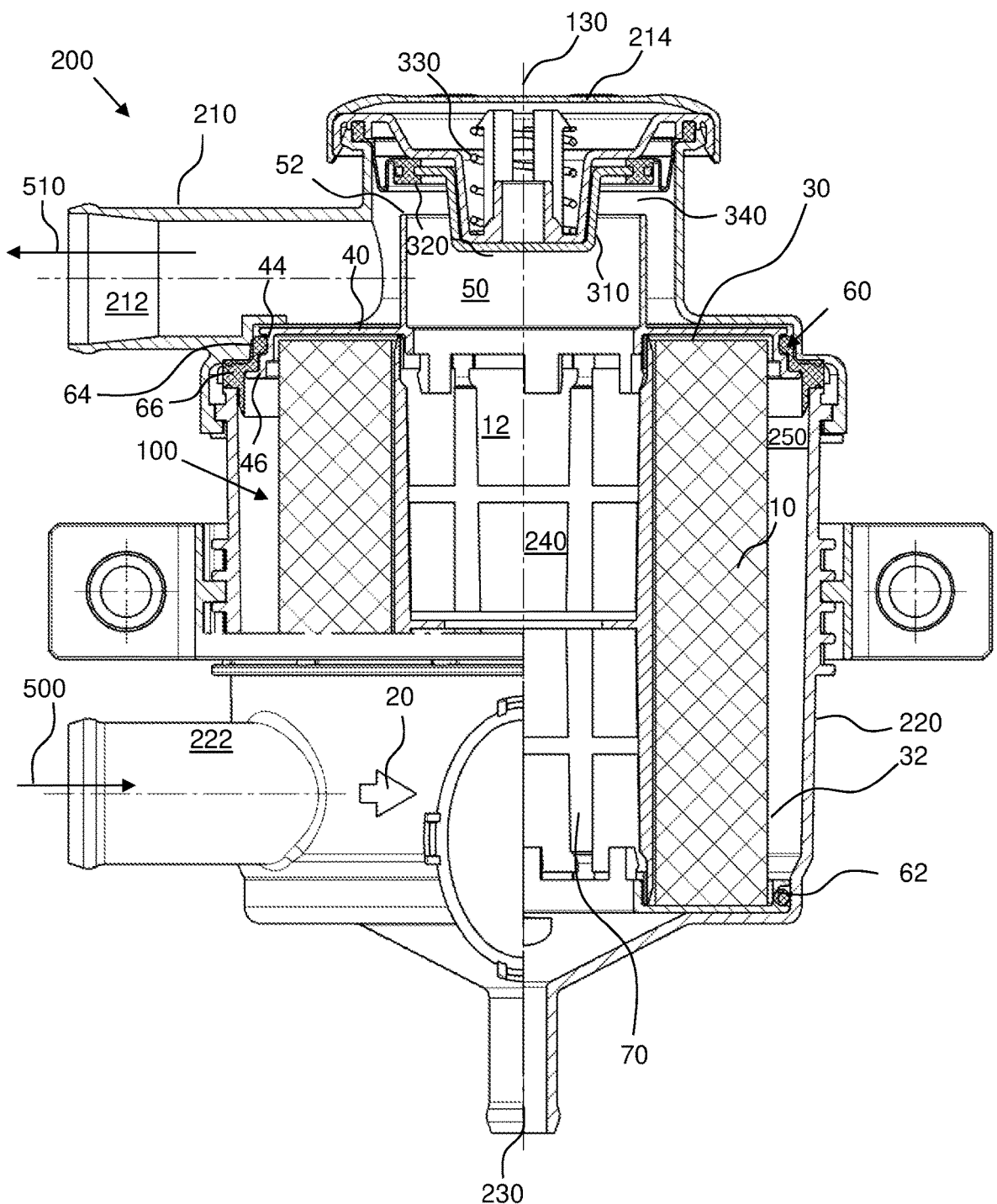
FIG. 2 illustrates a longitudinal depiction of a crankcase ventilation system from FIG. 1, with an embodiment of an oil separator having a filter element and a sealing element according to the present invention.

The oil separator 200 comprises a substantially oval-cylindrical—in particular, circular-cylindrical—filter housing composed of a first filter housing part 210—namely, a housing cover—and a second filter housing part 220—namely, a housing body. The second filter housing part 220 has an inlet 222 for the oil-containing air 500. Arranged in the filter housing is a filter element 100 comprising at least one filter medium 10 made of a filter material that has been arranged in an annular shape, e.g., a circular ring shape or an oval ring shape (see FIG. 2). The filter element 100 is covered by the filter housing in FIG. 1, and therefore is marked with a dashed reference line. Within the filter housing 210, 220, the air 500 (a corresponding air flow 20 is indicated in FIG. 2 by an arrow) is filtered by means of the filter medium 10. The resulting clean air 510 is guided out of an interior 12 (FIG. 2) enclosed by the filter medium 10, through a clean air discharge element 50 of the filter element 100, to a clean air outlet 212 of the housing cover 210, and from the clean air outlet 212 back into the intake duct of the internal combustion engine. Separated oil is removed through an oil outlet 230.

The oil separator 200 has a pressure control valve, in order to limit the crankcase vacuum to a defined value. The pressure control valve—depicted by way of example in FIGS. 2 and 3—has a valve closing body 310 that is surrounded by a valve closing body sealing element 320, preferably by a membrane, as is illustrated here.

On the end facing away from the valve closing body 310, the membrane 320 is connected to the first filter housing part 210, for example, by being clipped into the first filter housing part 210. Alternatively, the membrane 320 may also be mounted between the filter housing part 210 and the cover element 214. Preferably, the membrane is clamped between the first filter housing part 210 and an insert 350 forming even more preferably the lower stop of the spring 330, as in the presently-described embodiment. The insert 350 has openings, so that the ambient pressure can act on the membrane 320 and on the valve closing body 310.

In order to be closed, the pressure control valve has a valve seat 52 arranged on the filter element 100. In contrast to the prior art illustrated in FIGS. 12 and 13, the filter element 100 illustrated in FIGS. 2, 3, 8, and 10 has a cover element 40 that is configured as an end plate and has a sealing surface 52 at the end thereof that faces away from the filter element 100, wherein this sealing surface 52 is provided in order to seal off the pressure control valve 52, 310, 320, 330, by the ability of the valve closing body sealing element 320 or the valve closing body 310 to come into sealing contact with the sealing surface 52, preferably with a contact surface 312 (see FIG. 6) of the valve closing body 310 or the membrane 320.

The membrane 320 is configured to seal the clean air outlet 212 and the interior 12 of the filter medium 10 off from the ambient air pressure, and to keep the valve closing body axially movable.

Figure 10:
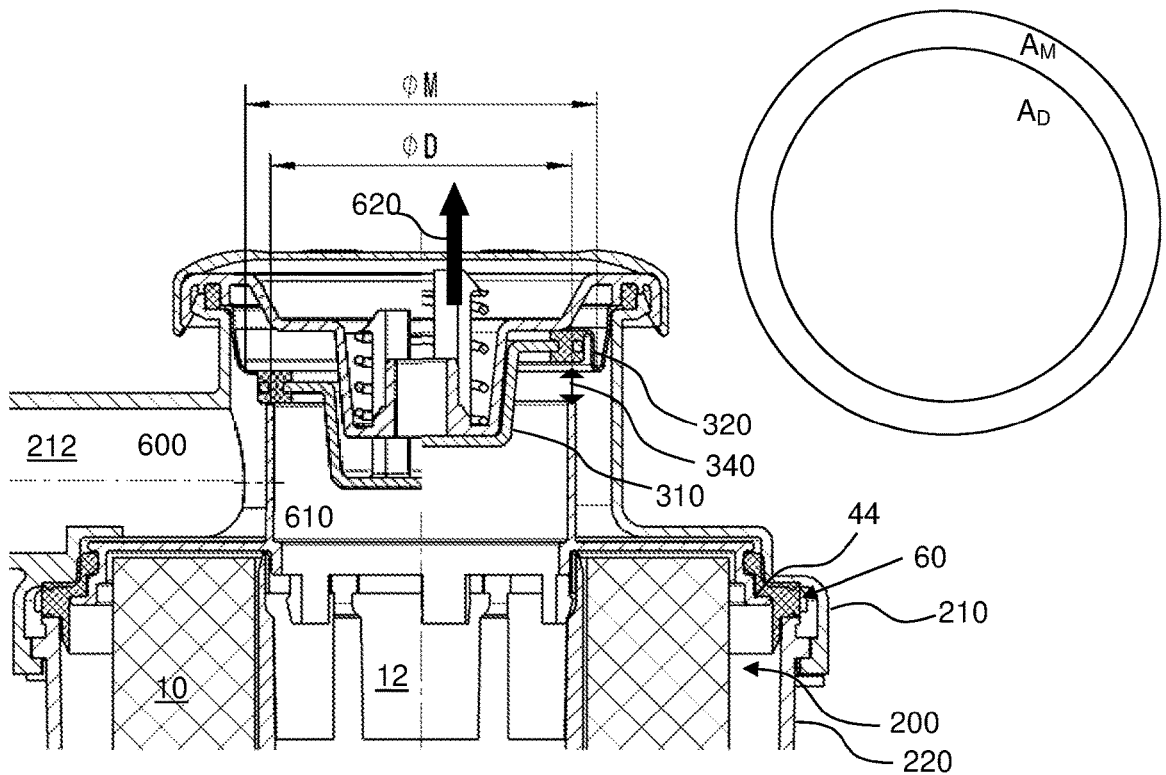
FIG. 10 illustrates a detail of the pressure control valve of the crankcase ventilation system from FIG. 1, wherein the forces acting on the valve closing body are marked.

The valve closing body 310 can be moved relative to the valve seat 52, as illustrated in FIG. 10. The left side of the illustrated sectional view depicts the closed state of the valve, where the valve closing body 310 abuts, preferably axially (as is shown), against the sealing surface 52 with a circular ring-shaped contact surface 312 (see FIG. 6); on the right side of the view, the valve closing body 310 is spaced apart from the sealing surface 52, so that the valve is open. The pressure control valve 52, 310, 320, 330 is configured so as to control the flow rate or volume flow of the fluid flowing away through the clean fluid discharge element 50, by means of the movement of the valve closing body 310 relative to the valve seat 52, in particular, through the modification of the cross-section of the flow channel 340 formed by the gap between the sealing surface 52 and the valve closing body 310.

The pressure control valve is configured such that the membrane 320 is subjected to the pressure 600 prevailing in the clean air outlet 212 on the side thereof facing the filter element 100 or the housing interior, in the region of the circular ring area $A_M$ defined by the diameters $Ø_M$ and $Ø_{M'}$, and the valve closing body 310 is subjected to the pressure 610 prevailing in the interior 12 of the filter medium 10 on the side thereof facing the filter element 100 or the housing interior, in the region of the circular area $A_D$ defined by the inner diameter $Ø_D$ of the sealing surface 52. On the side facing away from the filter element 100 or the housing interior, the membrane 320 and the valve closing body 310 are also subjected to the ambient pressure. Preferably also provided is a return spring 330 that subjects the membrane 320 and/or the valve closing body 310 to a force that acts in a direction of opening, i.e., is directed away from the filter element 100. At least one opening in a pressure control valve cover element 214 and/or an insert 350 causes ambient pressure to be applied to the back side of the membrane; this ventilation makes it possible for the pressure control valve to work undamped.

Preferably, a return spring 330—as already described—is arranged on the side of the valve closing body 310 that faces away from the filter element 100. The return spring 330 subjects the valve closing body 310 and/or the membrane 320 arranged thereon to a force 620 (see FIG. 10) oriented away from the valve seat 52. The compression spring or return spring 330 services to ensure the rest position of the valve closing body 310. The rest position corresponds to the position of the valve closing body 310 at which the force of the return spring 330 is exactly as great as the sum of the force of the crankcase pressure 610 and the force of the suction pressure 600.

On the way from the interior 12 of the filter medium 10 to the clear air outlet 212, the clean fluid flows through a flow channel 340 (see FIGS. 3 and 10) that is arranged between the valve closing body 310—in particular, the membrane 320 arranged on the valve closing body 310—and the valve seat 52, and that preferably has the shape of an annular gap, as is provided presently. The diameter of this flow channel 340 can be changed or regulated through relative movement of the valve closing body 310 to the valve seat 52.

With decreasing pressure in the clean air outlet 212 or on the exit side of the pressure control valve, the membrane 320 makes a stroke movement in the direction of the valve dome or valve seat 52, thereby reducing the cross-sectional area of the flow channel 340. This increases the flow resistance of the pressure control valve over the valve seat 52.

The control behavior of the pressure control valve can be adjusted via the diameter cross-section ratios $Ø_M$, $Ø_D$ of the membrane 320 and the inner diameter of the sealing surface 52 or the end surface of the clean fluid discharge element 50 that faces away from the filter element 100. FIG. 10 illustrates the cross-section diameter $Ø_M$ of the membrane 320 (which, in the present embodiment, is defined by the roll point of the membrane 320) and the cross-section inner diameter $Ø_M$ of the sealing surface 52.

The valve closing body 310 is in the rest position (closed position) when
a) the force F of the return spring 330
b) minus the differential pressure Δp from the atmospheric pressure and the crankcase pressure 610, multiplied by the cross-sectional area $A_D$ (defined by the inner diameter $Ø_D$ of the valve seat 52)
c) minus the differential pressure Δp from the atmospheric pressure and the suction pressure 600, multiplied by the cross-sectional area $A_M$ (defined by the ring between the cross-section diameter $Ø_M$ of the membrane 320 and the inner diameter $Ø_D$ of the valve seat 52) equals zero.

In summary, this gives:

$$0 = F_{return\ spring\ 330} - F_{(crankcase\ pressure\ 610)} - F_{(suction\ pressure\ 600)}$$
$$= F_{return\ spring\ 330} - \Delta p_{(atmospheric\ pressure - crankcase\ pressure)} * A_D - \Delta p_{(atmospheric\ pressure - suction\ pressure)} * A_M$$

The return spring 330 prevents the membrane 320 from being permanently closed at small suction vacuum pressures 600 from the turbocharger or intake duct of the engine. In addition, the location of the pressure control characteristics can be varied by means of the return spring 330. This means that with a harder return spring 330, the suction vacuum pressure 600 can act more intensely on the crankcase, and the curve shifts downward.

Figure 11:
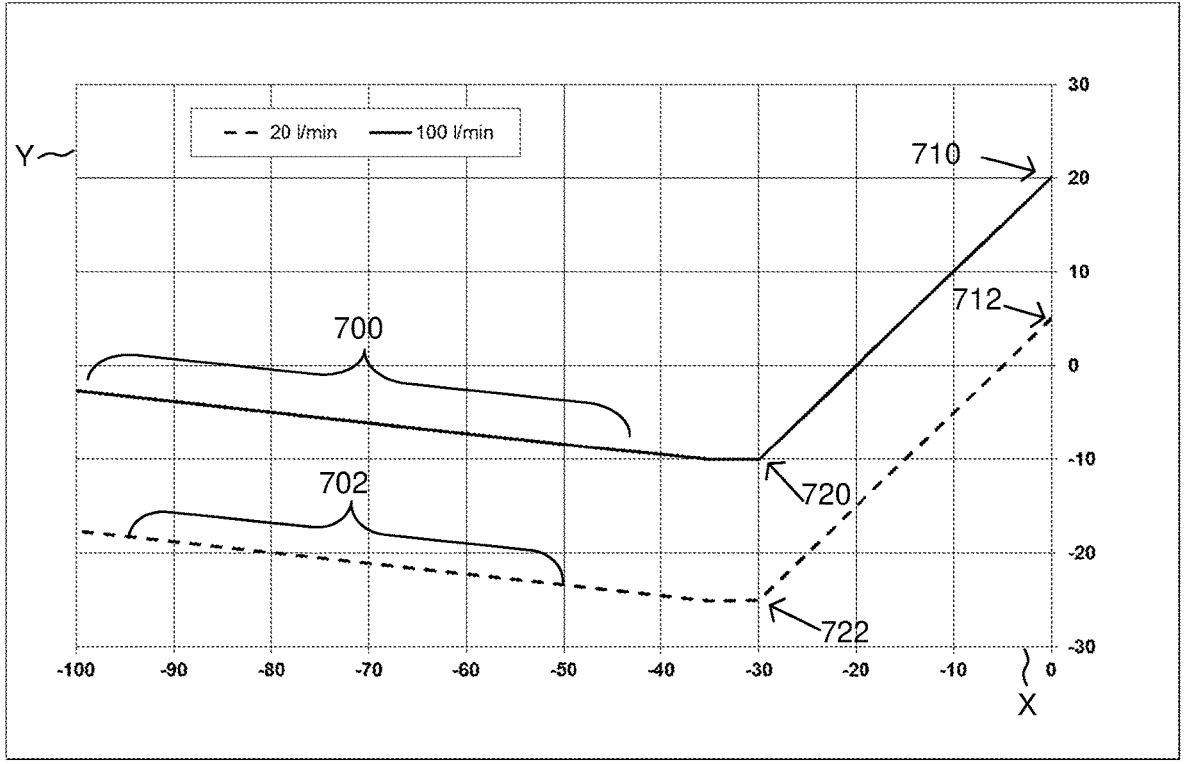
FIG. 11 illustrates an embodiment of a control characteristic of the crankcase pressure as a function of the vacuum on the outlet side of the pressure control valve of the crankcase ventilation system from FIG. 1.

FIG. 11 illustrates an exemplary control characteristic line of a pressure control valve. The Y-axis represents the pressure prevailing in the inlet for pre-filtration fluid 222 or on the pre-filtration side 250—in particular, the crankcase pressure—in hectopascals [hPa]. The X-axis represents the pressure prevailing in the clean air outlet 212—in particular, the suction vacuum pressure—in hectopascals [hPa]. The first control characteristic line, represented in FIG. 11 with a solid line, shows the pressure ratios at a volume flow in the pressure control valve of 100 liters per minute. The second control characteristic line, represented in FIG. 11 with a dashed line, shows pressure ratios at a volume flow in the pressure control valve of 20 liters per minute. The control range of the two control characteristic lines—shown by way of example—lies in the range of −2 to −28 hPa. The slope of the ranges of the two control characteristic lines marked with the reference signs 700, 702 depends on the area ratios $A_D$ and $A_M$ of the valve seat 52 and the membrane 320. The intersection of the two control characteristic lines with the Y-axis, marked with the reference signs 710, 712, shows the pressure drop with the pressure control valve is open.

As depicted in FIG. 11, the pressure drop of the oil separator 200 also affects the situation of the pressure control curve, wherein when the pressure drop or volume flow increases, the situation of the pressure control curve rises. Conversely, the crankcase pressure decreases with a lower volume flow.

The ratio of the cross-section diameters $\varnothing_M$ and $\varnothing_D$ of the membrane 320 and the sealing surface 52 influences the slope 700, 702 of the pressure control curve. If a negative pressure prevails in the crankcase relative to the atmosphere, and the pretension of the return spring 330 is overcome, then the membrane 320 moves onto the sealing surface 52, and the flow resistance increases.

First, if the suction vacuum pressure 600 is large enough and the return spring 330 is compressed, this results in a curved curve, and finally in a minimum of the crankcase pressure.

At even higher suction vacuum pressures, a slight increase in the pressure 610 is to be observed in the interior 12 of the filter medium, in particular, the crankcase pressure. In these operational ranges, the membrane 320 closes the suction side of the valve intermittently, and thus throttles or interrupts the volume flow. This intermediate pressure is higher than the minimum pressure, because when the valve seat 52 is closed and there is a strong suction vacuum pressure 600, the pressure 610 in the crankcase must be correspondingly higher, in order to for the membrane 320 to again be lifted off from the valve seat 52 against the suction vacuum pressure acting on the outside thereof.

The oil separator 200 may have an overpressure valve 800 (FIG. 1), for safety reasons. This overpressure valve may be configured, for example, as is described in DE 10 2013 005 624 A1.

Figure 8:
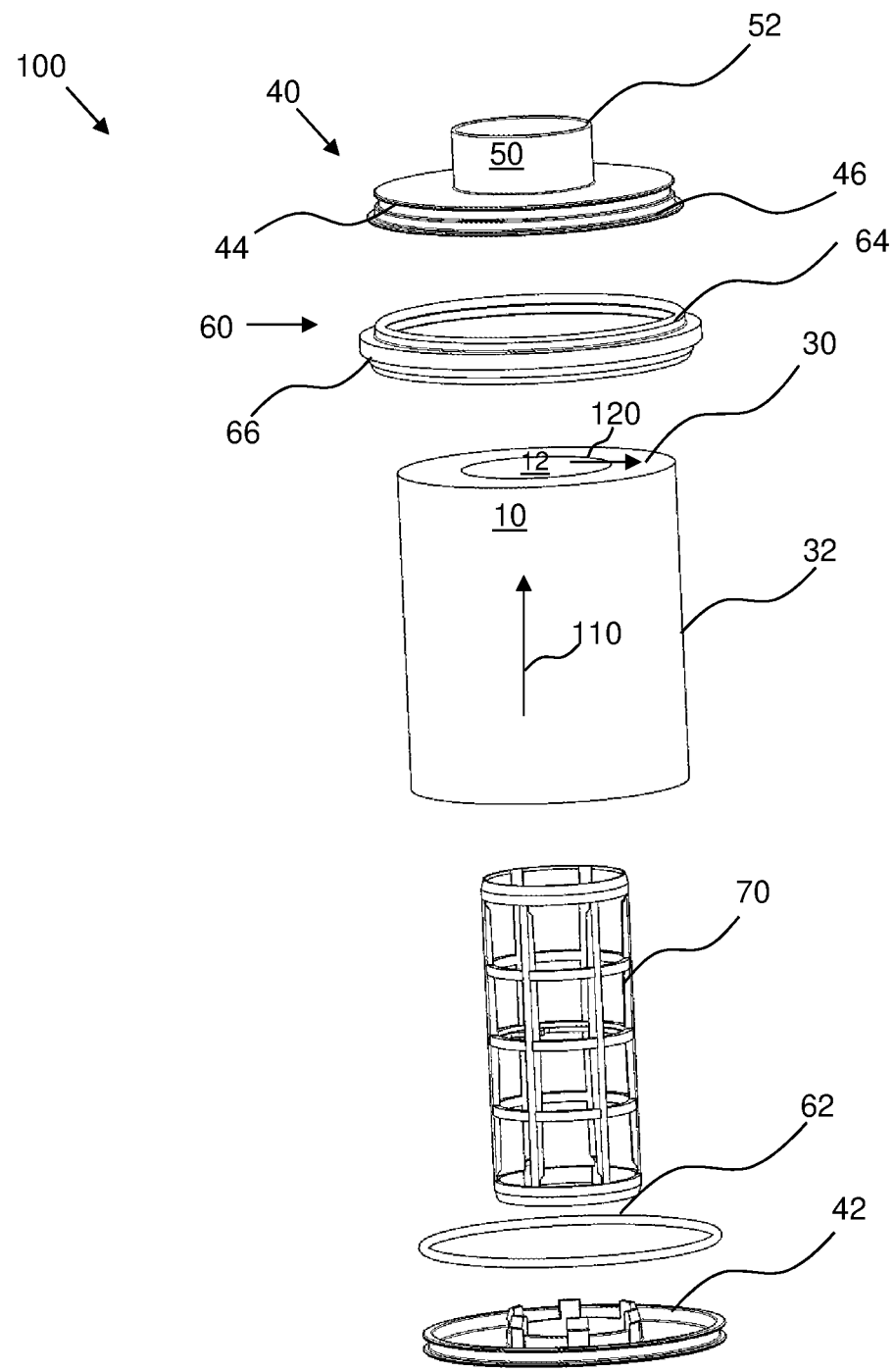
FIG. 8 illustrates a perspective exploded view of the components of an embodiment of a filter element having a sealing element according to the present invention.

FIG. 8 illustrates the components of an embodiment of a filter element 100 according to the present invention. This filter element 100 is configured for the crankcase ventilation system illustrated in FIG. 1. The filter element 100 has a cover element, in particular, an end plate 40. This end plate 40 covers the covering surface 30 (see FIG. 3) of the filter medium 10 facing the clean fluid outlet 212, and is connected sealingly thereto, so that the fluid flows through the filter medium 10 into the interior 12 of the filter medium 10. The filter element 100 is an annular coalescence element. For this purpose, the filter element 100 has, as preferred, a filter medium 10 configured as a non-woven fabric that is wrapped repeatedly and thus in a plurality of layers annularly around the central tube 70 (also called a support tube). The central tube 70 allows for flow therethrough and therefore has openings. This can be realized, for example, by a lattice-shaped configuration—as shown in FIG. 8—by means of a perforated plate or the like. The filter medium 10 is a non-woven wrap. For stabilization and sealing, it is preferably sealingly connected at each of the end faces—for example, by means of gluing or welding—to cover elements 40, 42 configured as end plates. The construction of the coalescence element with the wrapped non-woven fabric is thus fundamentally different from other filter elements, which are intended to separate solid particles from fluids such as air or oil and generally have a pleated filter medium.

The sealing surface 52 on the clean fluid discharge element 50 is spaced apart from the axial outer surface of the cover element 40. The axial installation space required for the clean fluid outlet 212 is thereby bridged. The length of the clean fluid discharge element 50, as measured from the axial, outer surface of the cover element 40, corresponds to the diameter of the clean fluid outlet 212 of the upper housing part 210. This makes it possible to achieve a streamlined overall design with which the positioning of the sealing surface 52 on the cover element 40 or on the filter element 100 is not accompanied by disadvantages.

Figure 3:
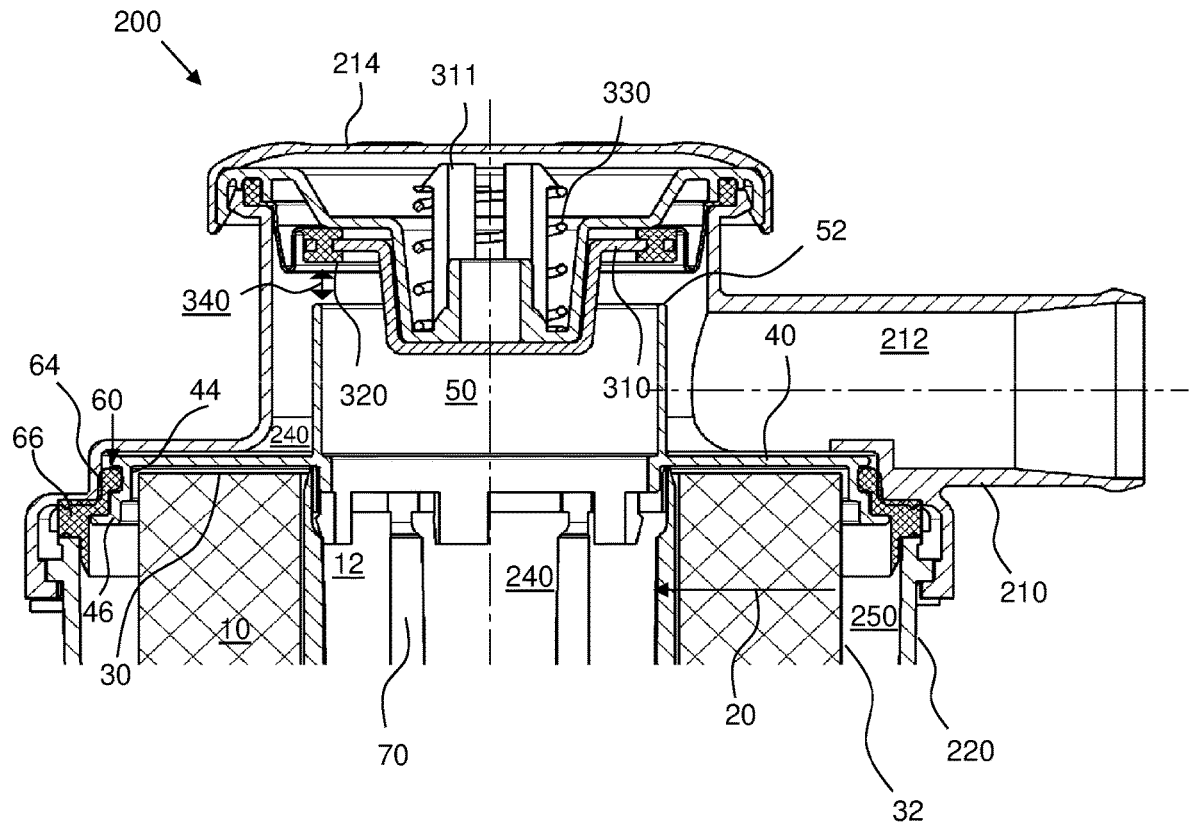
FIG. 3 illustrates a longitudinal view of a detail of the oil separator from FIG. 2.
Figure 4:
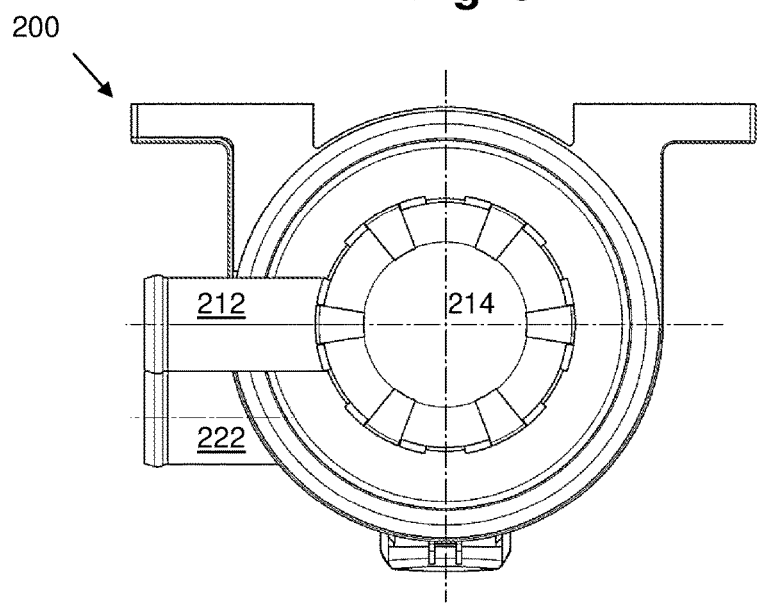
FIG. 4 illustrates a plan view of the oil separator from FIG. 2.
Figure 5:
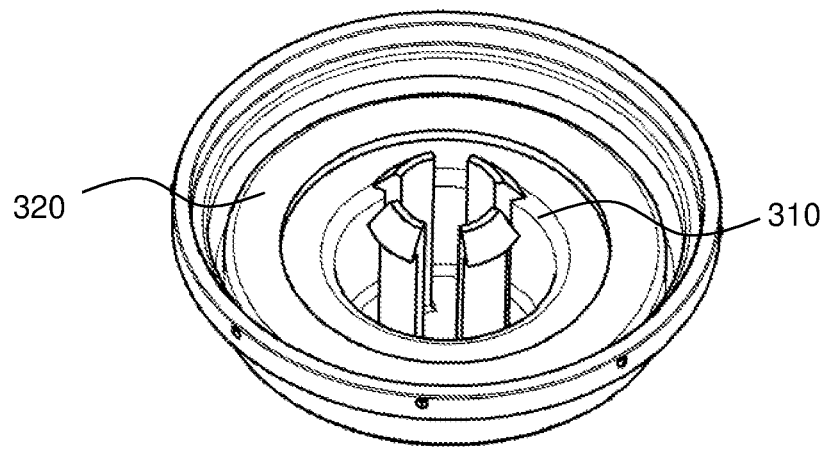
FIG. 5 illustrates a perspective view of the valve closing body and the valve closing body sealing element of the pressure control valve of the oil separator from FIG. 2.
Figure 6:
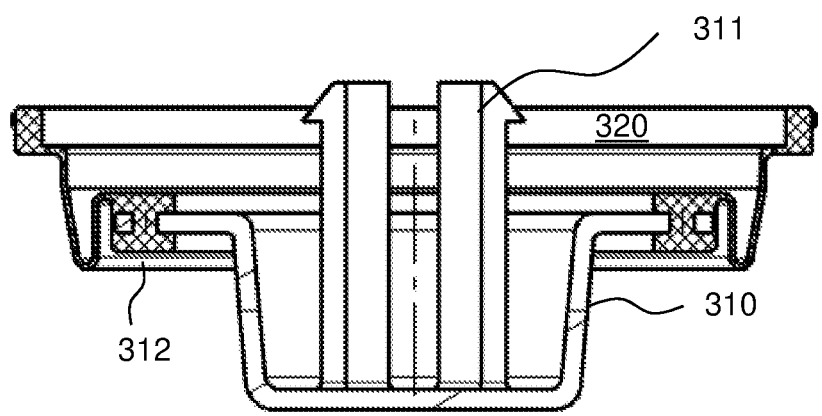
FIG. 6 illustrates a longitudinal view of the valve closing body and the valve closing body sealing element from FIG. 2.
Figure 7:
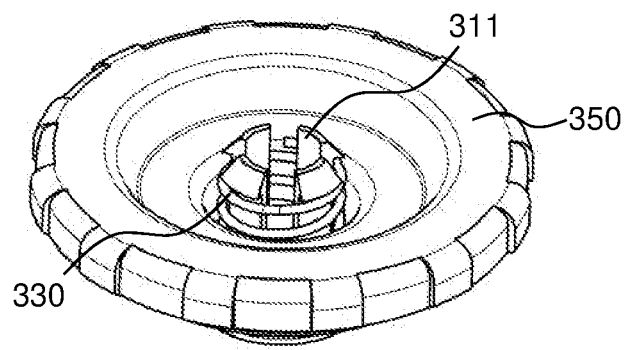
FIG. 7 illustrates a perspective view of the valve closing body, a return spring, and a pressure control insert of the oil separator from FIG. 2.

The cover element 40 is configured as an end plate of the filter element 100, as is preferred, in the embodiment illustrated in detail in FIGS. 2, 3, and 8. The cover element is sealingly and non-releasably connected to the filter medium at an end face of the filter element, for example, by gluing or welding. The cover element 40 is preferably produced from thermoplastic polymer, preferably by injection molding.

The clean fluid discharge element 50 is integrally, sealingly connected—as is preferred—to the cover element 40 in the embodiment illustrated in detail in FIGS. 2, 3, and 8.

The clean fluid discharge element 50 is preferably a circular-cylindrical, straight tube, as also illustrated in the drawings. This tube comprises a closed cylindrical wall and two open ends, wherein the sealing surface 52 is configured on one end that faces away from the cover element, and the other end is connected to the cover element 40, so that a fluid connection to the interior 12 of the filter medium 10 or filter body is formed. The ends are preferably oriented so as to be perpendicular to the central axis.

In the embodiment illustrated in detail in FIGS. 2, 3, and 8, as is preferred, the cover element 40 is configured as an annular end plate away from which the clean fluid discharge element 50, configured as a tube, extends integrally on the side facing away from the filter medium 10. The clean fluid element and the cover element preferably form a substantially L-shaped or alternatively T-shaped cross-section, as is illustrated.

The crankcase ventilation system has two spaces that must be separated from one another—namely, the pre-filtration space or pre-filtration side 250, on which the not-yet-cleaned blow-by gas is located, and the post-filtration space or post-filtration side 240, on which the cleaned gas is located. In addition, the pre-filtration space 250 and post-filtration space 240 must also be separated from the atmosphere. To solve this problem only with a seal, the filter element 100—illustrated, for example, in FIG. 8—has a sealing element configured as a combination seal, namely, a filter element seal 60 that makes it possible to separate all three regions from one another.

The filter element seal 60 (see FIGS. 2, 3, and 8) thus serves to seal off the pre-filtration side 250 of the filter element 100 from the post-filtration side 240 of the filter element 100, the interior of the housing upper part 210 to the ambient air pressure, and the interior of the housing lower part 220 to the ambient air pressure.

A special advantage of the filter element seal 60 illustrated in FIGS. 2, 3, and 8 over filter element seals from the prior art is the functional decoupling of two sealing functions, namely, the sealing off of the interior of the filter housing 210, 220 from the environment on one hand, and the sealing off of the pre-filtration side 250 from the post-filtration side 240 on the other hand. The two sealing regions illustrated in FIGS. 2 and 8—namely, the radially sealing region 64 and the axially sealing region 66—are functionally independent, but integrated into one part, namely, the sealing element 60.

The filter element seal 60 illustrated in FIGS. 2, 3, and 8 thus has a region 64 that is radially compressed by means of a defined force, and a region 66 that is axially compressed by means of a defined force, wherein the radially compressed region 64 and the axial compressed region 66 are connected to one another and form a continuous sealing element, which fulfills two independent sealing functions. The sealing forces are defined by a person skilled in the art, by designing the sealing parameters of Young's modulus, seal dimensions, and sealing gap dimensions.

A defined radial seal can be provided in the oil separator 200 illustrated in FIGS. 2, 3, and 8 by radially compressing the filter element seal 60 by means of a defined force between the housing upper part 210 and the end plate 40. This is advantageously achieved by the extension of the housing upper art 210 to the height of the end plate 40, the end plate 40 thus being arranged over the housing edge of the housing upper part 210.

The radially sealing region 64 may be configured in the manner of an O-ring (see FIGS. 2 and 3). The axially sealing region 66 is, in particular, configured in the form of a bead having a substantially rectangular cross-section, and preferably also has two opposite sealing surfaces that are in sealing contact with the housing upper part 210 and lower housing part 220, and are compressed axially between the housing parts. In this case, the filter element seal 60 is composed of an O-ring and an axial seal, which are produced in combination.

The spacing apart of the sealing regions 64, 66 is advantageously achieved by means of a connecting strut that connects the two sealing regions. The connecting strut preferably has an L-shaped cross-section, as shown in FIGS. 2, 3, and 8. This signifies that from a first leg and connecting strut section that forms a hollow cylindrical shape and is connected to the radially sealing region 64, another leg protrudes radially inward or outward, thus forming a circular annular disc-shaped second connecting strut section and connecting to the axially sealing region 66. This makes it possible for a housing upper part 210 in a narrow installation region to provide independent sealing surfaces corresponding to the sealing regions, e.g., by the housing upper part or housing cover having a cross-section that is also L-shaped in sections in the region of the sealing element 60, wherein the axial leg provides a contact surface for the radially sealing region and the radial leg provides a contact surface for the axially sealing region of the sealing element.

In the interior 12 of the filter medium 10, a central tube 70 configured as a support element for the filter medium 10 may be arranged. The central tube supports the filter medium 10 and protects same against collapse.

In order to ensure that the fluid flows through the filter medium 10 into the interior 12 of the filter medium 10, the filter element 100 has another cover element 42—in particular, another end plate 42—on the end thereof that faces the oil outlet 230.

In order to seal off the post-filtration side of the filter element from the pre-filtration side of the filter element, another filter element seal 62—configured, for example, as an O-ring—for sealing off the additional cover element 42 from the housing part 220 may be associated with the additional cover element 42, which is also preferably configured as an end plate, in particular, as an open end plate having a central opening for the oil drain. This additional filter element seal 62 is preferably arranged radially outward on the additional cover element 42.

Figure 9:
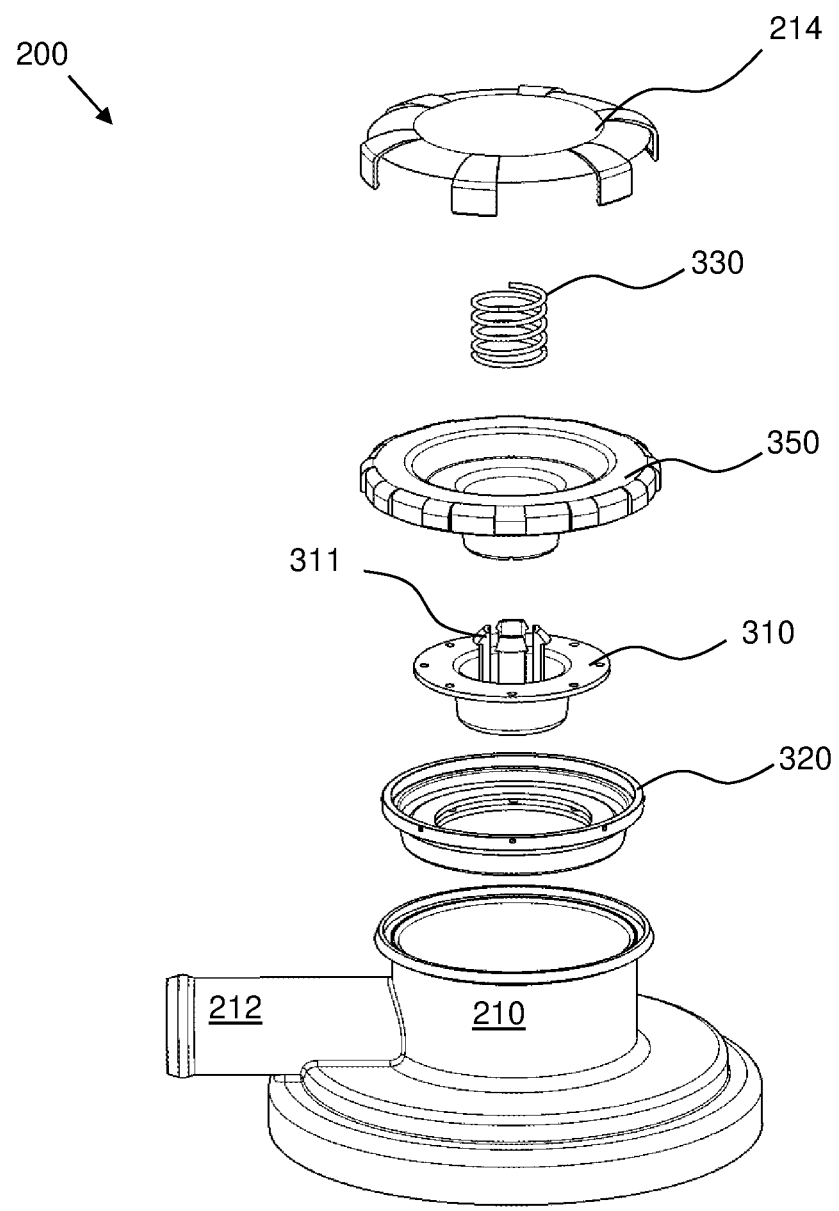
FIG. 9 illustrates a perspective exploded view of the components arranged in the housing cover of the crankcase ventilation system depicted in FIG. 1.

FIG. 9 illustrates an exploded view of the components of pressure control arranged in the upper housing part 210. The sealing surface 52 is also a component of pressure control. Because the sealing surface 52 is arranged on the filter element 100, the sealing surface is depicted in FIG. 8.

The valve closing body 310 and the membrane 320 perform a vertical stroke movement in the pressure control (see FIG. 9). In this vertical stroke movement, the valve closing body 310 and the membrane 320 are moved to the filter element 100 and away from the filter element.

The components of pressure control illustrated in FIG. 9 include:

the pressure control element cover element 214, which is configured to cover the first housing part 210 and has an opening to the atmosphere;

the valve closing body 310;

the membrane 320;

preferably at least one insert 350 that is arranged between the membrane 320 and the valve closing body 310 and is configured for pressure control, the return spring 330; and the first housing part 210.

The return spring 330 is arranged on the side of the valve closing body 310 that faces away from the valve seat 52, and is supported down in the insert 350, which preferably also has an opening. The return spring 330 is thus located on the atmosphere side. The valve closing body 310 preferably has at least one and particularly preferable—as is presently shown—three or four continuations 311 that protrude through at least one opening of the insert 350. The return spring may thus preferably be axially mounted between the insert 350 and the continuation or continuations 311, in particular, the hooks at the end of the continuations. In this manner, the return spring 330 can exert an opening force—in particular, a force oriented away from the sealing surface 52—on the valve closing body.

Figure 12:
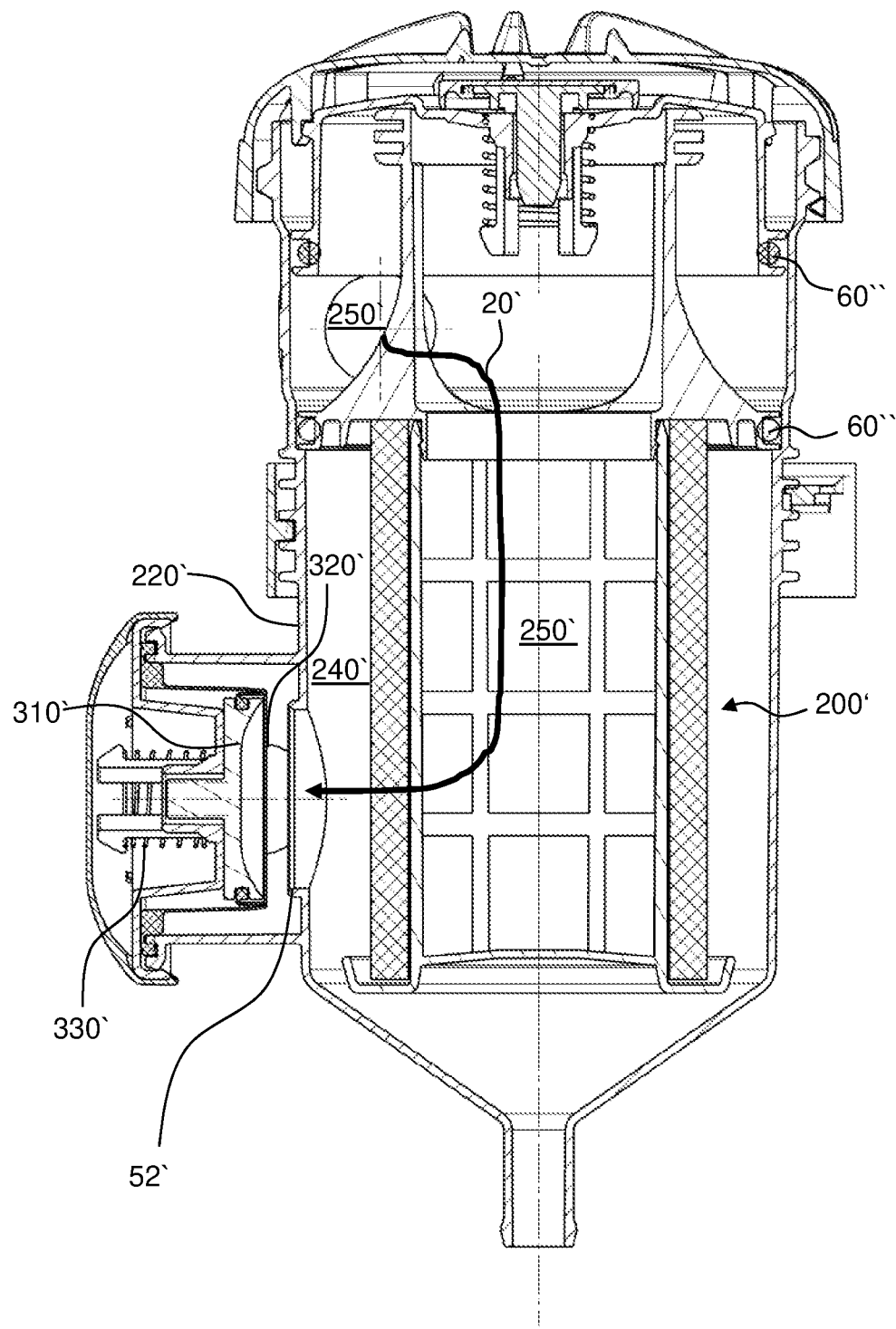
FIG. 12 illustrates an oil separator according to the prior art.
Figure 13:
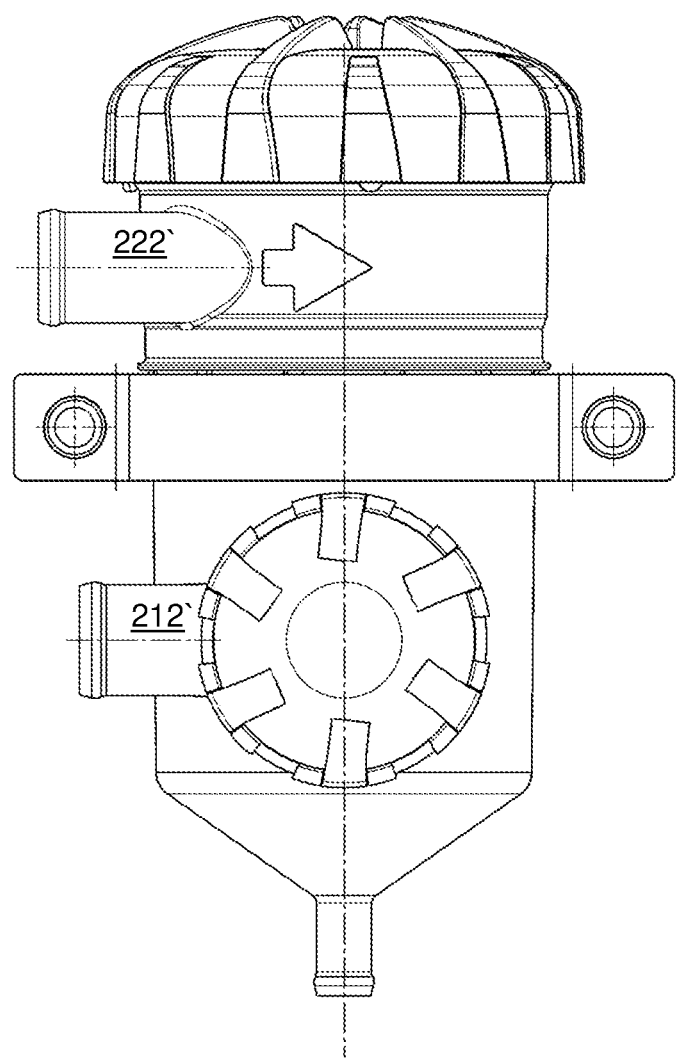
FIG. 13 illustrates a side view of the oil separator from FIG. 12, which is configured according to the prior art.

FIGS. 12 and 13 illustrate an embodiment of an oil separator 200' of a crankcase ventilation system according to the prior art. The pressure control of this oil separator 200' is located on the side of the second housing part 220'. The valve closing body 310' has the form of a dish. The valve seat 52' is here injection-molded onto the housing outside. The seal between the valve seat 52' and the valve closing body 310' happens hard to hard, in particular, through identical materials of the two components. This combination of identical materials of the valve seat 52' and the region of the valve closing body 310' that can be brought into contact with the valve seat 52' negatively affects the sealing behavior.

According to an advantageous embodiment, it is provided that the return spring 330 is located on the atmosphere side in the embodiment of the present invention illustrated in FIGS. 1 to 11. Preferably, the return spring is protected in a space formed by the membrane 320 and the valve closing body 310 on one side and by the pressure control valve cover element 214 on the other side. Arrangement on the outside of the fluid flow protects the spring against the influence of impurities that are contained in the fluid flow and are deposited on the spring.

In contrast to the filter medium 100 illustrated in FIGS. 2 and 3, the fluid flows through the filter medium according to the prior art that is illustrated in FIG. 12 from inside to the outside. The direction of flow of the fluid is marked with an arrow.

Instead of a combination seal, the crankcase ventilation system illustrated in FIG. 12 has two separated O-rings 60" in order to seal the post-filtration side 240 of the filter element 100 off from the environment and seal the pre-filtration side 250 of the filter element 100 off from the post-filtration side 240 of the filter element 100.

LIST OF REFERENCE SIGNS

10 Filter medium, in particular, non-woven wrap
12 interior or cavity enclosed by the filter medium 10
20 direction of flow of the fluid to be filtered; in particular, direction of flow of the pre-filtration fluid 500 flowing through the filter medium 10, in the present invention (see FIGS. 2 and 3)
30 Covering surface of the filter medium 10
32 Outer surface of the filter medium 10
40 Cover element of the filter medium 10; in particular, end plate of the filter medium 10 that faces the clean fluid outlet 212
42 Additional cover element of the filter medium 10; in particular, end plate of the filter element 100 that faces the oil outlet 230
44 Fastening contour of the end plate 40 configured in order to fasten the sealing element 60
46 Support contour of the end plate 40 (see FIG. 8)
50 Clean fluid discharge element; in particular, dome or nozzle configured in order to remove the clean fluid—for example, a tubular clean fluid discharge element
52 Sealing surface, in particular, valve seat of the filter element 100 of the present invention
52' Valve seat in the prior art (FIGS. 12 and 13)
60 Sealing element according to the present invention (see FIGS. 2, 3, and 8); in particular, a filter element seal, for example, to seal the pre-filtration side of the filter element 100 off from the post-filtration side of the filter element 100, and to seal the interior of the filter housing off from the environment;
60" Second embodiment for a sealing element, in particular, for a filter element seal according to the prior art (see FIG. 12)
62 Additional filter element seal; in particular, O-ring
64 Radially sealing region of the sealing element 60; in particular, a compressed region of the sealing element 60 within the filter housing
66 Axially sealing region of the sealing element 60; in particular, a compressed region of the sealing element 60 between the first housing part 210 and the additional housing part 220
70 Support element, in particular, central tube, of the filter element 100
100 Filter element; in particular, annular filter element, for example, replaceable filter element or exchangeable element
110 Longitudinal axis of the annular filter element 100 or the housing body 220 (see FIG. 8)
120 Radius of the annular filter element 100 or the housing body 220 (see FIG. 8)
130 Axis of rotation (see FIG. 2)
200 Oil separator of the crankcase ventilation system of the present invention (FIGS. 1 to 4, 9, and 10)
200' Oil separator of the prior art (FIGS. 12 and 13)
210 First or upper housing part of the oil separator 200; in particular, housing cover of the filter housing of the oil separator 200
212 Clean fluid outlet of the oil separator 200 of the present invention; in particular, clean fluid outlet of the first or upper housing part 210
212' Clean fluid outlet of the oil separator of the prior art (FIGS. 12 and 13)
214 Pressure control valve cover element
220 Additional, second, or lower housing part of the oil separator 200 of the present invention (FIGS. 1 to 3 and 10); in particular, housing body of the filter housing of the oil separator 200
220' Lower housing part of the oil separator 200' of the prior art (FIGS. 12 and 13)
222 Inlet for pre-filtration fluid, in particular, for oil-containing gas, for example, for oil-containing air, of the oil separator 200 of the present invention (FIGS. 1, 2, and 4)
222' Inlet for pre-filtration fluid, in particular, for oil-containing gas, for example, for oil-containing air, of the oil separator of the prior art (FIGS. 12 and 13)
230 Oil outlet
240 Post-filtration space or post-filtration side of the filter element 100 of the present invention
240 Post-filtration space or post-filtration side of the filter element according to the prior art (see FIG. 12)
250 Pre-filtration space or pre-filtration side of the filter element 100 of the present invention
250' Pre-filtration space or pre-filtration side of the filter element according to the prior art (see FIG. 12)
310 Valve closing body, in particular, control pin, of the oil separator 200 of the present invention
310' Valve closing body, in particular, control pin, of the prior art (FIGS. 12 and 13)
311 Continuations; in particular, hook-shaped continuations which protrude upward from the valve closing body and with which the return spring 330 can engage, the continuations preferably being integral with the valve closing body
312 Contact surface of the valve closing body for contacting with the sealing surface
52 of the filter element 100, in particular, in order to close the valve
320 Valve closing body sealing element; in particular, a membrane surrounding the valve closing body 320, for example, a membrane extending between the valve closing body 310 and the first housing part 210
320' Valve closing body sealing element of the prior art (FIGS. 12 and 13)
330 Return spring of the oil separator 200 of the present invention
330' Return spring of the prior art (FIGS. 12 and 13)
340 Flow channel arranged between the valve closing body 310, in particular, the valve closing body sealing element 320, and the sealing surface 52
350 Insert configured for pressure control
410 Housing of the crankcase ventilation system 500 Pre-filtration fluid, in particular, oil-containing gas, for example, oil-containing air
510 Clean fluid, in particular, clean gas, for example, clean air
600 Force exerted through the pressure prevailing in the clean air outlet 212, in particular, suction pressure, for example, suction vacuum pressure
610 Force exerted through the pressure prevailing in the interior 12 of the filter medium 10, in particular, the crankcase pressure
620 Force exerted through the return spring 330
700 Range of the first control characteristic line where the slope thereof is dependent on the dimensions, in particular, on the area ratios $A_M/A_D$
702 Range of the second control characteristic line where the slope thereof is dependent on the dimensions, in particular, on the area ratios $A_M/A_D$
710 Point of intersection of the first control characteristic line with the Y-axis, which shows the pressure drop when the pressure control valve is open
712 Point of intersection of the second control characteristic line with the Y-axis, which shows the pressure drop when the pressure control valve is open
720 Inflection point of the first control characteristic line as a function of the compression spring or spring rate of the return spring 330
722 Inflection point of the second control characteristic line as a function of the compression spring of the return spring 330 or the spring rate of the return spring 330
800 Overpressure valve
$A_M$ Cross-sectional area of the membrane 320
$A_D$ Cross-sectional area of the inner diameter $Ø_D$ of the sealing surface 52, or the cross-sectional area of the inner diameter of the end surface of the clean fluid discharge element 50 facing away from the filter element 100
$Ø_M$ Cross-section diameter of the membrane 320
$Ø_D$ Cross-sectional inner diameter of the sealing surface 52 or inner diameter of the end surface of the clean fluid discharge element 50 facing away from the filter element 100

What is claimed is:

1. A filter element for an oil separator of a crankcase ventilation system, the filter element comprising:
   at least one filter medium surrounding a central axis, the at least one filter medium configured to separate oil from aerosol, the at least one filter medium having an axial end surface forming a covering surface extending in a radial direction relative to the central axis;
   a cover element formed as an annular end plate, fixed onto and fully covering the covering surface of the at least one filter medium; and
      a tubular projection projecting axially outwardly away from the cover element and the at least one filter medium, the tubular projection having an open interior which opens through the cover element into an interior of the at least one filter medium, wherein the tubular projection is a clean fluid discharge element configured to remove cleaned fluid from an interior of the filter element;
      wherein an axially outer end of the tubular projection of the filter element has an annular sealing surface forming a valve seat;
      wherein the tubular projection is configured as a clean fluid discharge element that extends away from the filter element and is configured to remove cleaned fluid from an interior of the filter element to the valve seat of the cover element;
      wherein the valve seat of the cover element is configured as a sealing surface for a pressure control valve body of the crankcase ventilation system to sealably close against.

2. The filter element according to claim 1, wherein
   the filter element is oval-cylindrical; and
   wherein the filter element has a cavity in the interior of the at least one filter medium;
   wherein the fluid to be filtered flows from the outer surface of the filter medium to the cavity; and
   wherein the cavity is connected directly to the clean fluid discharge element in order to remove the cleaned fluid.

3. The filter element according to claim 1, wherein
   the clean fluid discharge element and/or the annular sealing surface is formed of at least one mechanically fixed and/or rigid material;
   wherein the at least one mechanically fixed and/or rigid material is a moldable material selected from the set consisting of: polyurethane, polyamide, or polyamide formed from polyamide 66 with 35% glass fiber (PA 66 GF 35).

4. The filter element according to claim 1, wherein
   the annular sealing surface, the clean fluid discharge element, and the cover element are integrally formed as a unitary one-piece component.

5. The filter element according to claim 1, wherein
   the at least one filter medium is a multi-layered non-woven wrap.

6. The filter element according to claim 1, wherein
   the cover element and clean fluid discharge element are continuously closed.

7. The filter element according to claim 1, wherein
   the annular sealing surface of the tubular projection is circular, substantially flat and free of burrs.

8. The filter element according to claim 1, wherein
   a circumferential edge of the annular sealing surface of the tubular projection is rounded.

9. An oil separator for a crankcase ventilation system, comprising:
   an oil separator housing including:
      a first housing part; and
      a second housing part secured to the first housing part and enclosing a chamber therein;
   a filter element according to claim 1 arranged in the chamber of the oil separator housing;
   wherein the first housing part includes
      at least one oil separator clean fluid outlet configured to remove the cleaned fluid; and
   the pressure control valve is configured to limit the negative pressure applied in the crankcase ventilation system, the pressure control valve formed in combination by:
      the valve seat of the filter element; and
      a valve closing body accommodated in the first housing part that operates in conjunction with and sealably closes against the valve seat;
   wherein the sealing surface of the tubular projection of the cover element of the filter element forms the valve seat against which the valve closing body sealably closes when the pressure control valve is in a closed state.

10. The oil separator according to claim 9, wherein
    the valve closing body comprises
       at least one elastic valve closing body sealing element, at least on a region thereof arranged to contact with the valve seat of the filter element; and wherein the at least on a region of the at least one valve closing body is surrounded by an elastic valve closing body sealing element on the region thereof that is arranged to contact with the valve seat of the filter element.

11. The oil separator according to claim 10, wherein
the valve closing body sealing element is formed out of at least one elastomer;
wherein the at least one elastomer are selected from the set: ethylene acrylate rubber (EAR) and/or from acrylate rubber and/or from hydrogenated nitrile rubber (H)NBR.

12. The oil separator according to claim 9, wherein
the valve closing body sealing element is connected fixedly, non-releaseably to the valve closing body;
wherein the valve closing body sealing element is applied onto the valve closing body by a spray process.

13. The oil separator according to claim 9, wherein
the valve closing body is flat or level on the region thereof that faces the valve seat and contacts with the valve seat of the filter element.

14. A method for limiting the crankcase vacuum of a crankcase ventilation system to a predetermined value, comprising:
providing an oil separator housing enclosing a chamber therein;
providing a filter element configured to separate oil from fluid, including:
at least one filter medium surrounding a central axis, the at least one filter medium that is configured to separate oil from aerosol, the at least one filter medium having an axial end surface forming a covering surface extending in a radial direction relative to the central axis;
a cover element formed as an annular end plate, fixed onto and fully covering the covering surface of the at least one filter medium; and
a tubular projection projecting axially outwardly away from the cover element and the at least one filter medium, the tubular projection having an open interior which opens through the cover element into an interior of the at least one filter medium, wherein the tubular projection is a clean fluid discharge element configured to remove cleaned fluid from an interior of the filter element;
wherein an axially outer end of the tubular projection of the filter element has an annular sealing surface forming a valve seat;
wherein the tubular projection is configured as a clean fluid discharge element that extends away from the filter element and is configured to remove cleaned fluid from an interior of the filter element to the valve seat of the cover element;
wherein the valve seat of the cover element is configured as a sealing surface for a pressure control valve closing body of the crankcase ventilation system to sealably close against; and
providing the pressure control valve configured to limit the negative pressure applied in the crankcase ventilation system, the pressure control valve formed in combination by:
a valve closing body that operates in conjunction with valve seat of the cover element;
wherein the sealing surface of the filter element forms the valve seat against which the valve body closes;
arranging the filter element replaceably in the chamber of the oil separator housing;
arranging the valve closing body of the pressure control valve in the oil separator housing such that the valve closing body is closeable against the valve seat of the filter element;
operating the pressure control valve responsive to prevailing pressure in the crankcase ventilation system to limit the crankcase vacuum such that the valve closing body is moved relative to the filter element and the valve seat of the filter element to control crankcase vacuum.

15. The filter element according to claim 1, further comprising:
at least one annular sealing element of elastic sealing material arranged on the filter element;
wherein the at least one annular sealing element is spaced radially away from and closed circumferentially about the central axis of the filter element;
wherein the at least one annular sealing element comprises:
an axial sealing element having an axial sealing region sealing between and compressed axially between an upper housing part and a lower housing part, when installed in an oil separator housing configured to receive the filter element; and
a radial sealing element having a radial sealing region sealing radially between the cover element and a radially inner side of the upper housing part, when installed in the oil separator housing configured to receive the filter element;
wherein axial, as used herein, is a direction of the central axis,
wherein radial, as used herein, is a direction transverse to the central axis.

* * * * *